US007724957B2

(12) United States Patent
Abdulkader

(10) Patent No.: US 7,724,957 B2
(45) Date of Patent: May 25, 2010

(54) TWO TIERED TEXT RECOGNITION

(75) Inventor: Ahmad A. Abdulkader, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 11/461,050

(22) Filed: Jul. 31, 2006

(65) Prior Publication Data
US 2008/0025610 A1 Jan. 31, 2008

(51) Int. Cl.
G06K 9/18 (2006.01)
(52) U.S. Cl. .................. 382/186; 382/185; 382/190; 382/195; 382/198; 382/227
(58) Field of Classification Search .......... 382/186, 382/185, 190, 195, 198, 227
See application file for complete search history.

(56) References Cited

U.S. PATENT DOCUMENTS

| 4,010,445 | A |   | 3/1977  | Hoshino              |
|-----------|---|---|---------|----------------------|
| 5,005,205 | A |   | 4/1991  | Ellozy et al.        |
| 5,029,223 | A |   | 7/1991  | Fujisaki             |
| 5,392,363 | A |   | 2/1995  | Fujisaki et al.      |
| 5,438,631 | A |   | 8/1995  | Dai                  |
| 5,442,715 | A | * | 8/1995  | Gaborski et al. ............ 382/187 |
| 5,454,046 | A |   | 9/1995  | Carman               |
| 5,768,451 | A |   | 6/1998  | Hisamitsu et al.     |
| 5,933,525 | A | * | 8/1999  | Makhoul et al. ............ 382/186 |
| 6,005,973 | A |   | 12/1999 | Seybold et al.       |
| 6,011,865 | A |   | 1/2000  | Fujisaki et al.      |
| 6,327,386 | B1| * | 12/2001 | Mao et al. ................. 382/186 |
| 6,539,113 | B1|   | 3/2003  | Van Kleeck           |
| 2004/0141646 | A1 | * | 7/2004 | Fahmy et al. ............... 382/187 |

FOREIGN PATENT DOCUMENTS

EP 0120481 3/1984

OTHER PUBLICATIONS

Alma'adeed. Recognition of Off-Line Handwritten Arabic Words Using Neural Network, Proceedings of the Geometric Modeling and Imaging-New Trends, Jul. 5-6, 2006, pp. 141-144.
International Search Report for International Patent Application No. PCT/US2007/015214 dated Jan. 2, 2008, 3 pages.
Elgammal, A., et al; A graph-based segmentation and feature extraction framework for Arabic text recognition; 2001; 5 pages.
Al-Yousefi, H., et al.; Recognition of Arabic characters; Aug. 1992; 5 pages.
Abuhaiba, I., et al.; Recognition of handwritten cursive Arabic characters; Jun. 1994; 9 pages.

* cited by examiner

Primary Examiner—Matthew C Bella
Assistant Examiner—Mike Rahmjoo
(74) Attorney, Agent, or Firm—Lee & Hayes, PLLC

(57) ABSTRACT

Systems and methods that exploit unique properties of a language script (e.g., condition joining rules for Arabic language) to enable a two tier text recognition. In such two tier system, one tier can recognize predetermined groups of linked letters that are connected based on joining rules of a language associated with the text, and another tier dissects (and recognizes) such linked letters to respective constituent letters that form the predetermined group of linked letters. Various classifiers and artificial intelligence components can further facilitate text recognition at each level.

16 Claims, 9 Drawing Sheets

TWO TIERED TEXT RECOGNITION

BACKGROUND

Advances in computer technology (e.g., microprocessor speed, memory capacity, data transfer bandwidth, software functionality, and the like) have generally contributed to increased computer application in various industries. For example, computer based decision-support systems are commonly employed in recognition systems, such as Optical Character Recognition (OCR), and related text recognition applications.

Typically, scanners or optical imagers were initially developed to "digitize" pictures (e.g., input images into a computing system). Subsequently, such systems were applied to other printed and typeset material, and OCR systems gradually extended to a plurality of computer applications. In general, OCR technology is tuned to recognize limited or finite choices of possible types of fonts. Such systems can in general "recognize" a character by comparing it to a database of pre-existing fonts. If a font is deemed incoherent, the OCR technology returns unidentifiable or non-existing characters, to indicate non-recognition of such incoherent text.

Moreover, handwriting recognition has proved to be an even more challenging scenario than text recognition. In general, a person's handwriting exemplifies an individualistic style that shows through penmanship. Accordingly, by its very nature, handwriting patterns exhibit diverse forms, even for the same character. Obviously, storing every conceivable form of handwriting for a particular character is not feasible.

Various approaches have been developed to recognize patterns associated with such handwritten characters. Most handwriting recognition systems employ recognizers based on Neural Nets, Hidden Markov Models (HMM) or a K-Nearest-Neighbor (KNN) approach. In general, such systems perform reasonably well at the task of classifying characters based on their total appearance. For example, a level of similarity can be determined by generating a distance measure between patterns.

However, the recognition of handwritten text in images, commonly known as offline handwriting recognition, remains a challenging task. Significant work is still to be done before large scale commercially viable systems can be efficiently built. These problems are further magnified by non-Latin languages/scripts such as Arabic, Farsi, and the like— wherein less research effort has been allocated for addressing the associated recognition problems involved.

Typically, majority of research in Arabic offline recognition has been directed to numeral and single character recognition. Few examples exist where the offline recognition of Arabic words problem is addressed. Recent construction of standard publicly available databases of handwritten Arabic text images (e.g., IFN/INIT database) has slowly encouraged further research activities for these scripts/languages.

In contrast, for Latin scripts, Hidden Markov Model (HMM) based approaches have dominated the space of offline cursive word recognition. In a typical setup, a lexicon is provided to constrain the output of the recognizer. An HMM can then be built for every word in the lexicon and the corresponding likelihood (probability of data being generated by the model) is computed. In general, the most likely interpretation is then postulated to be the correct one.

In the few reported approaches to Arabic text recognition, similar approaches like Latin text recognition methodologies have been typically employed. Moreover, various attempts performed to modify the preprocessing and feature extraction phases to accommodate the different nature of the Arabic writing script have not proved to be efficient. In addition, such attempts in general do not exploit the unique properties of Arabic script such as condition joining rules for recognition purposes.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for recognizing a text via employing a two tier approach, wherein one tier recognizes predetermined groups of linked letters that are connected based on joining rules of a language associated with the text (a word subgroup), and another tier dissects such linked letters to respective constituent letters (which form the predetermined group of linked letters), for a recognition thereof. For example, one tier of recognition can initially identify a user defined lexicon of Arabic text, which is predefined based on condition joining rules of the Arabic language (e.g., Part of an Arabic Word—PAW.) Upon determining best matching PAW(s), another tier directs the recognition process to a letter search that forms such PAW. Accordingly, such tiered approach provides for a higher likelihood of recognition for letters, because the search is being narrowed to predetermined combinations of letters (the word subgroup).

Accordingly, the subject innovation can decompose the recognition methodology into two processes that can be performed side by side. The first process constrains a search to predetermined groups of linked letters that are connected based on joining rules of a language associated with the text. In the second process the search is constrained to the individual letters that form the predetermined group of linked letters. For example, in Arabic language the first process (e.g., tier one) of the search is constrained by a letter to PAW lexicon. In Tier two, the search is constrained by a PAW to word lexicon. Directing the searches is a Neural Net based PAW recognizer.

In a related aspect, a system for implementing the two tier approach can employ a neural net based work recognizer component(s) that identifies predetermined groups of linked letters (e.g., identifies PAWs). Moreover, a training component can train the recognizer component to identify additional grouping of letters as part of the predetermined group (e.g., PAWs not initially recognized due to group of linked word not initially defined; such as foreign names, spelling errors, and the like.) Various artificial intelligence components can also be employed to facilitate different aspects of the subject innovation.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advan-

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
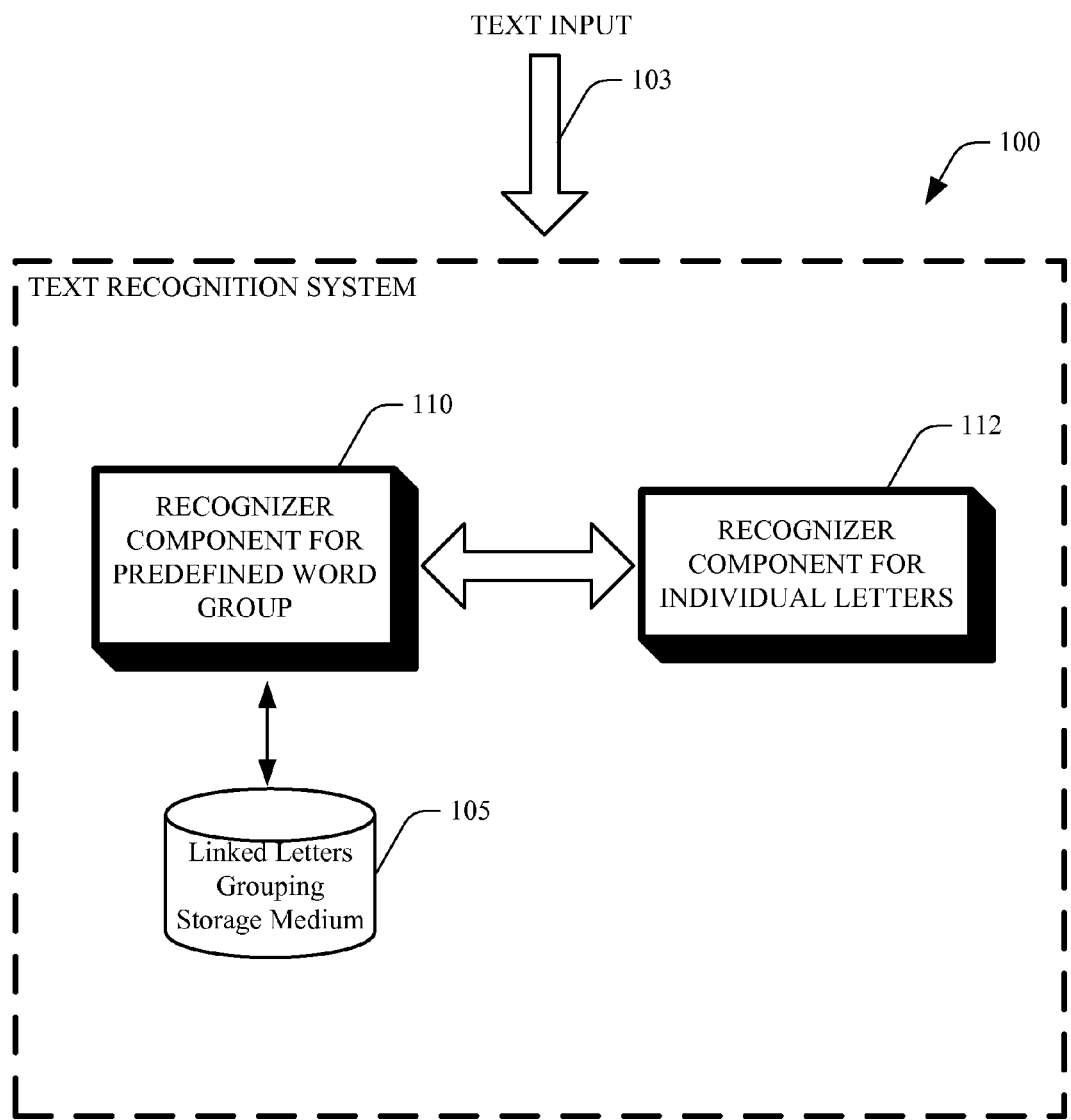
FIG. 1 illustrates a block diagram of an exemplary system that performs a two tiered text recognition system in accordance with an aspect of the subject innovation.

Referring initially to FIG. 1 there is illustrated a text recognition system 100 in accordance to an aspect of the subject innovation. Such recognition system 100 further includes a recognizer component 110 that identifies predefined groups of linked letters (word subgroups), which are connected together based on joining rules of a language associated with the text. Likewise, recognizer component 112 can recognize individual letters that form the predetermined group of linked letters. Accordingly, the subject innovation can decompose the recognition methodology into two processes that can be performed side by side. The first process constrains a search to predetermined groups of linked letters that are connected based on joining rules of a language associated with the text. In the second process, the search is constrained to the individual letters that form the predetermined group of linked letters.

For example, the recognizer component 110 can process incoming text signals 103 or "visual patterns", and compare such patterns with a database 105 that stores the predetermined grouping of letters, which can be predefined earlier based on rules of the language associated with such text. For example, the recognizer component 110 can include feature extraction layer(s) and classifier layer(s) (not shown). As such, the recognizer component 110 can receive a text input 103 (e.g., a two dimensional bitmap input pattern) and provide a probability that such pattern matches a pattern of predefined group of connected letters stored in the storage medium 105. The incoming signals for the text input 103 can be entered directly at the system or be received via a remote link (e.g., a network or communications link).

It is to be appreciated that the text recognition system 100 can also be utilized to perform hand written pattern recognition and/or character recognition. For example, the pattern can result from scanned documents and/or can be a two-dimensional bitmap projection of a pen or a mouse trajectory. Also, such data received can be any character and/or input from a user that is handwritten. For instance, various computing devices and/or systems utilize handwriting inputs such as, but not limited to, tablets, portable data assistants (PDA's), mobile communication devices, a stylus pen, a wand, an interactive display device with touch screen ability, and the like.

In one exemplary aspect, the text recognition system 100 operates based on a convolutional neural network (CNN) architecture, which as explained earlier can further include feature extraction layer(s) and classifier layer(s). In general, "Convolutional layers" can refer to components of a neural network in which a group (e.g., feature map) employs substantially the same set of coefficients or weights at different locations, to modify the inputs received. It is also possible that various groups (e.g., feature maps) use different sets of coefficients. Accordingly, the groups (e.g., feature maps) can extract different feature(s) from the inputs received. The outputs of the feature extraction layer(s) can be connected to the classifier layer(s). Additionally, the text recognition system can 100 learn from input training data, such as utilizing cross entropy error minimization. For example, the text recognition system 100 can be trained using stochastic gradient descent minimizing cross entropy error.

Moreover, if data is deemed ambiguous by the recognizer component 110, and/or the recognizer component 112, then a "confusion rule" that utilizes user-specific post-processor techniques to classify a character and/or image can be employed. Accordingly, different types of post-processor classifications can be utilized within the subject innovation, such as, MLLR (Maximum Likelihood Linear Regression) adapted density models, direct density models, and direct discriminative models and the like. Such flexibility to employ different models and classifiers allows the subject innovation to readily integrate with existing handwriting recognition techniques. Thus, the subject innovation can utilize a generic classifier based upon collective observations from multiple users and/or a user-specific classifier that has been adapted from a generic classifier by other means than the user-specific classifiers in the present invention in order to enhance a handwriting recognition system's ability to identify data from a specific user.

Figure 2:
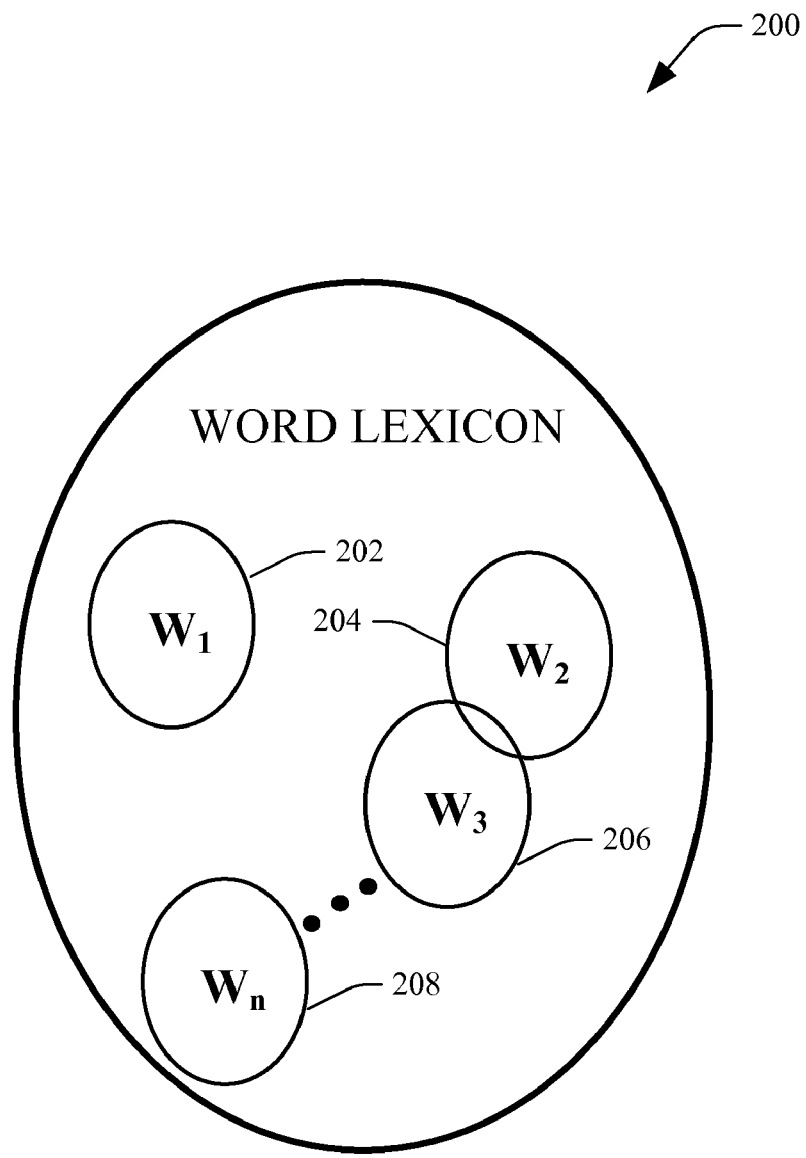
FIG. 2 illustrates an exemplary relation for predetermined groups of linked letters that are connected based on joining rules of a language associated with the text.

FIG. 2 shows an exemplary illustration 200 for predetermined groups of linked letters that are connected based on joining rules of a language associated with the text. For example, sub-groups 202, 204, 206, 208 ($W_1$ to $W_n$, n being an integer) that pertain to a group of joined letters (e.g., word sub-parts) that are linked together based on joining rules of a language associated with writings for such text. Moreover, a probabilistic approach can also be employed as a criteria for creating/defining such linked letters 202, 204, 206 and 208, wherein linked letters are identified if they occur more than a predetermined frequency within a writing sample.

Figure 3A:
FIGS. 3a & 3b illustrate particular aspects of condition joining rules directed to Arabic text recognition that enables various aspects of the subject innovation.
Figure 3B:

For example, alphabet of the Arabic language, is composed of 28 basic letters, wherein the script is cursive and all primary letters have conditional forms for their glyphs, depending on whether they are at the beginning, middle or end of a word. Up to four distinct forms (initial, medial, final or isolated) of a letter can be exhibited. In additional, only six letters, namely: "ﺪ", "ﺬ", "ﺮ", "ﺰ", "ﻭ" have either an isolated or a final form and do not have initial or medial forms. Such letters, if followed by another letter, typically do not join therewith. Accordingly, in general the next letter can only have its initial or isolated form, even though it is not being the initial letter of a word. Such rule applies to numerals and non-Arabic letters, and is typically referred to as conditional joining. FIGS. 3a & 3b illustrate exemplary conditional joining property in Arabic script. FIG. 3a illustrates a final form of a letter following a joining letter. Likewise, FIG. 3b illustrates isolated final form of the same letter following a non-joining letter. Such conditional joining property enables defining Part of Arabic Word(s) (PAWs), wherein a PAW is a sequence of Arabic letters that are joined together. In general, any Arabic word can be deterministically segmented into one or more PAWs.

In addition, given such conditional joining property of the Arabic writing script, words can be viewed as being composed of a sequence of PAWs. Put differently, PAWs can be considered as an alternative alphabet. The unique number of PAWs constituting a word lexicon can be limited to a finite number, e.g., grows sub-linearly with the number of words in the lexicon. Hence, according to a particular aspect of the subject innovation a lexicon of Arabic words can then be decomposed into two lexica. One is a PAW to letter lexicon, which lists all the unique PAWs and their spelling in terms of the letter alphabet. Another is a word to PAW lexicon that lists all the unique words and their spelling in terms of the PAW alphabet.

Consequently, the methodology of finding the best matching lexicon entry to an image can be decomposed into two intertwined processes that can be performed simultaneously. One process is finding the best possible mapping from characters to PAWs constrained by the PAW to letter lexicon. Another process is identifying the best possible mapping from PAWs to words constrained by the word to PAW lexicon.

Figure 4:
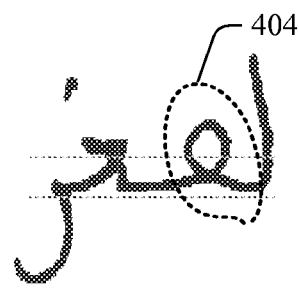
FIG. 4 illustrates an exemplary recognition error for Arabic text that can be mitigated in accordance with an aspect of the subject innovation.

Such two-tier approach can mitigate recognition errors. For example, lexicons can constrain the outputs of the recognition process, and a plurality of character recognition errors can also be resolved in the PAW recognition phase. FIG. 4 illustrates an exemplary recognition error that can be mitigated in accordance with an aspect of the subject innovation. As illustrated in FIG. 4, it is unlikely that the second letter 404 that is intended as a "ﺺ" would have been so identified/proposed by a character recognizer—given how poorly it is written. Hence, image of the "ﺼﺮ" PAW can be confused with "ﻟﻐﺬ" which is a valid lexicon PAW, yet can be readily sorted out in the recognition phase, for example. It is to be appreciated that probability of appearance for PAWs in words, and respective frequency of use can also be employed by the PAW recognizer component to favor more frequently occurring PAWs. Such prior probabilities can typically be viewed as a linguistic n-gram character model that drives the recognition process.

Figure 5:
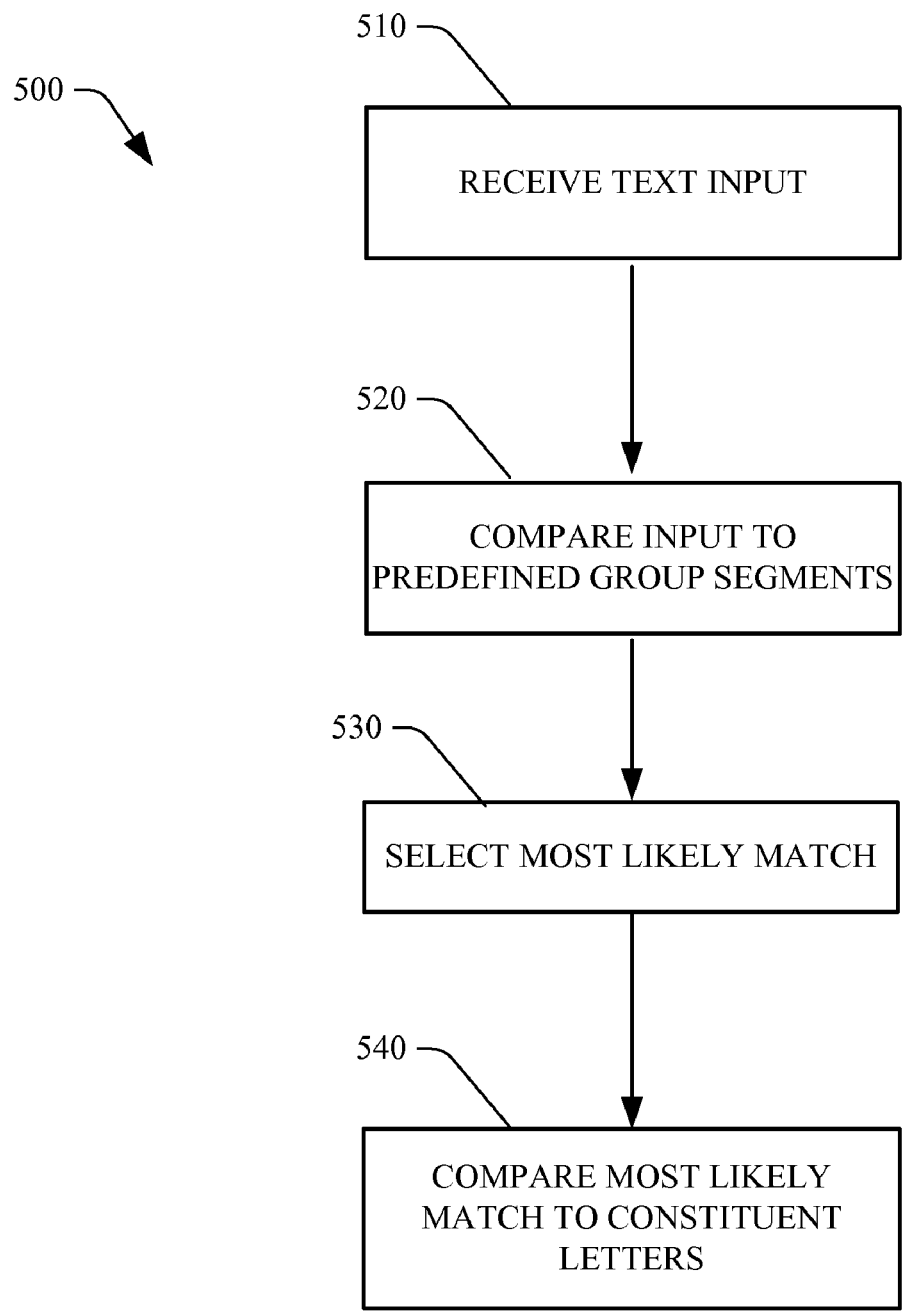
FIG. 5 illustrates a related methodology of two tier text recognition in accordance with an aspect of the subject innovation.

FIG. 5 illustrates a related methodology 500 in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 510, a text input that requires recognition is received by a text recognition system of the subject innovation. Such input can be received via an incoming signal that is entered directly at the system or received via a remote link (e.g., a network or communications link). Next, and at 520 the input image is compared to a predetermined groups of linked letters that are connected based on joining rules of a language associated with the text. Upon such comparison and at 530 a most likely match is then selected. Subsequently, and as part of the additional recognition tier of the subject innovation, such most likely match of linked letters are compared to constituent letters that form the predetermined group of linked letters. Accordingly, such tiered approach provides for a higher likelihood of recognition for letters, because the search is being narrowed to predetermined combinations of words and letters.

Figure 6:
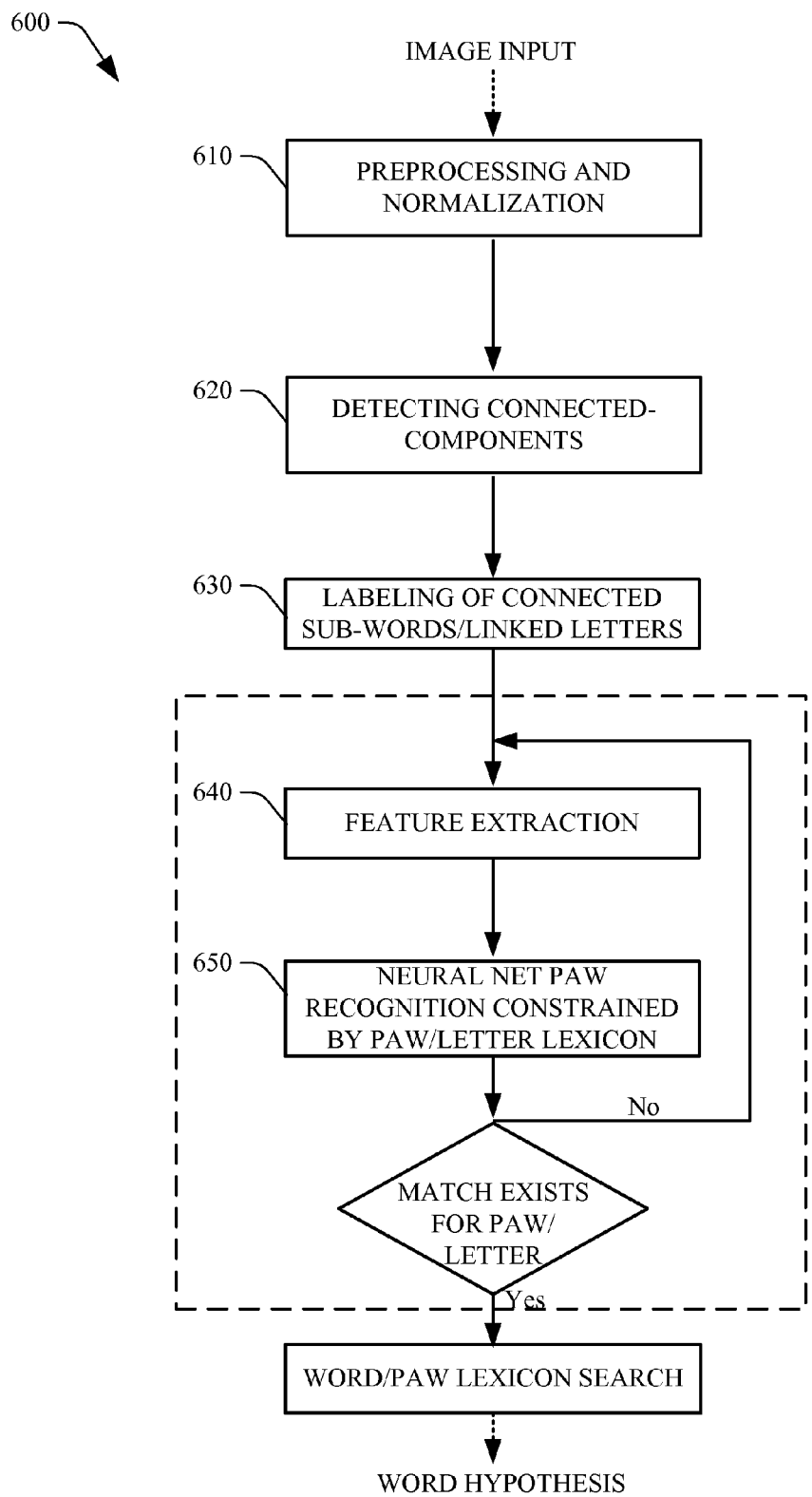
FIG. 6 illustrates a related methodology that describes the preprocessing, normalization, segmentation, recognition and search acts in accordance with particular aspects of the subject innovation.

FIG. 6 illustrates a related methodology 600 that describes the preprocessing, normalization, segmentation, recognition and search acts in accordance with a particular aspect of the subject innovation. At 610, received images pass through basic processing of image binarization, cropping, word segmentation, noise reduction, and the like. Subsequently, and at 620 the connected word sub group (e.g., predetermined groups of linked letters that are connected based on joining rules of a language associated with the text) can be detected. For example, connected sub group of words whose width and height are below a certain threshold are obtained. Block 620 can act as an additional noise reduction.

Connected sub groups of words can subsequently be sorted from right to left based on their rightmost point. Such enables the search algorithm of the subject innovation to sequence through the sub group of words in an order that approximates the writing order. Connected sub groups of words can then be labeled (e.g., as 'primary' and 'secondary'), at 630. The labeling can be performed by detecting relative horizontal overlaps between connected subgroup(s) of words and applying safe thresholds on sub-group of words, as illustrated in FIG. 7.

For example, each secondary connected of sub groups can be associated with a primary one, and typically no secondary component can exist alone. At 640, features related to image input can be extracted, for a neural network classifier recognition of predefined word subgroups (e.g., PAWs) at 650. For example, two Neural Net PAW classifiers can be employed. The first classifier can consist of a convolutional Neural Network, wherein the input image is scaled to fit a fixed size grid while maintaining its aspect ratio. Since the number of letters in a PAW can vary from 1 to 8, the grid aspect ratio is typically selected to be wide enough to accommodate the widest possible PAW, and still maintain its distinctness. The second classifier can be based on features extracted from the directional codes of the connected letters (sub word group) that constitute the PAW. For example, for the Arabic language each of the two classifiers can have 762 outputs, which can be trained with training sets that reflect predetermined distributions of PAWs in the word lexicon.

As explained in detail supra, the subject innovation decomposes the word lexicon into two lexica, namely a letter to PAW lexicon and a PAW to word lexicon. The letter to PAW lexicon is used to constrain the output of the PAW recognizer, and the PAW to word recognizer is employed to constrain the search for the best matching word.

Additionally, heuristic functions (e.g., best-first search, Beam Search) can be employed in conjunction with the subject innovation. For example, the Beam search can be utilized to find the best matching word to an image, by using the output of PAW recognizer as a search heuristic. The search sequences through the connected word subgroup(s), and considers either starting a new PAW or adding the group to the existing PAW. The list of possible PAWs together with their corresponding posterior probabilities produced by the PAW recognizer can be retained. Different connected subgroup words to PAW mappings can be maintained in a lattice of possible segmentations. After sequencing through all the groups, the best possible segmentation can be evaluated and chosen to be the winning hypothesis.

For instance, to typically assure that the segmentation possibilities in the lattice do not explode, two heuristics can be employed, wherein the maximum number of connected word groups per PAW can be capped at 4, for example—(being determined empirically based on the training data.) Moreover, at every step in the lattice, segmentation possibilities that have a probability that is lower than the most probable segmentation by a predetermined threshold can then be pruned.

Figure 7A:
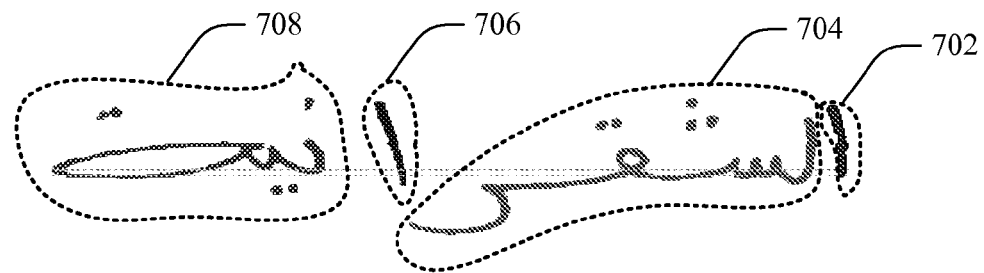
FIGS. 7a, 7b & 7c illustrate exemplary labeling for various scenarios of sub groups of words, in accordance with an aspect of the subject innovation.
Figure 7B:
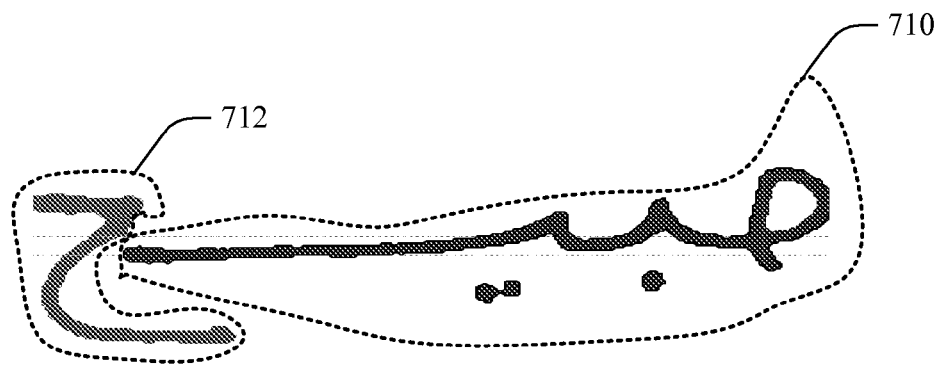
Figure 7C:
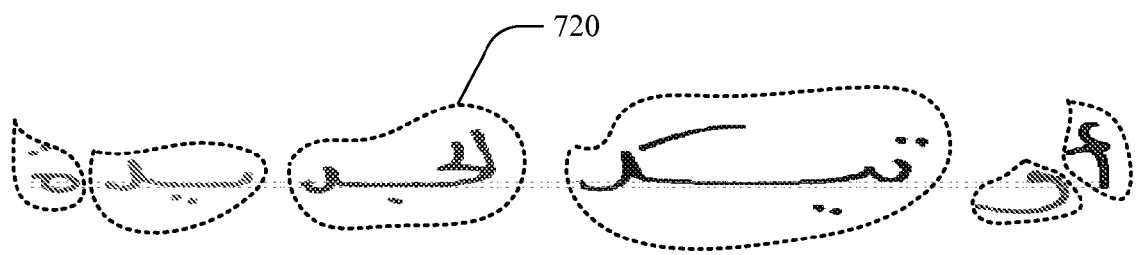

FIGS. 7a, 7b & 7c illustrate exemplary labeling for various scenarios of sub groups of words, in accordance with an aspect of the subject innovation. FIG. 7a illustrates a case, wherein each of the words/sub group of connected words 702, 704, 706, and 708 is an actual PAW. Typically, such scenario consists of approximately 65% of the overall population of words in an Arabic text. Likewise, FIG. 7b illustrates a case wherein a PAW is split into two groups 710, 712, wherein the combination of such two groups 710, 712 can correspond to a single PAW (e.g., an over-segmentation case). Such scenario typically occurs around 30% in the word population. Similarly, FIG. 7c illustrates a scenario, wherein the subgroup 720 is actually two PAWs that touch each other. In general, these cases constitute around 5% of the cases. To address such under-segmentation case, wherein more then one PAW is being segmented as one connected-word group 720, an additional act can be included and is triggered if the probability of the winning segmentation path in the lattice is lower than a predetermined threshold. Accordingly, when triggered, a Viterbi search can be performed on the individual PAW recognition results of the connected word sub-groups. In this search the edit distance between the each of the PAW to Word lexicon and the recognition results are computed. Both PAW insertions and deletions can be allowed with a penalty associated with each.

Figure 8:
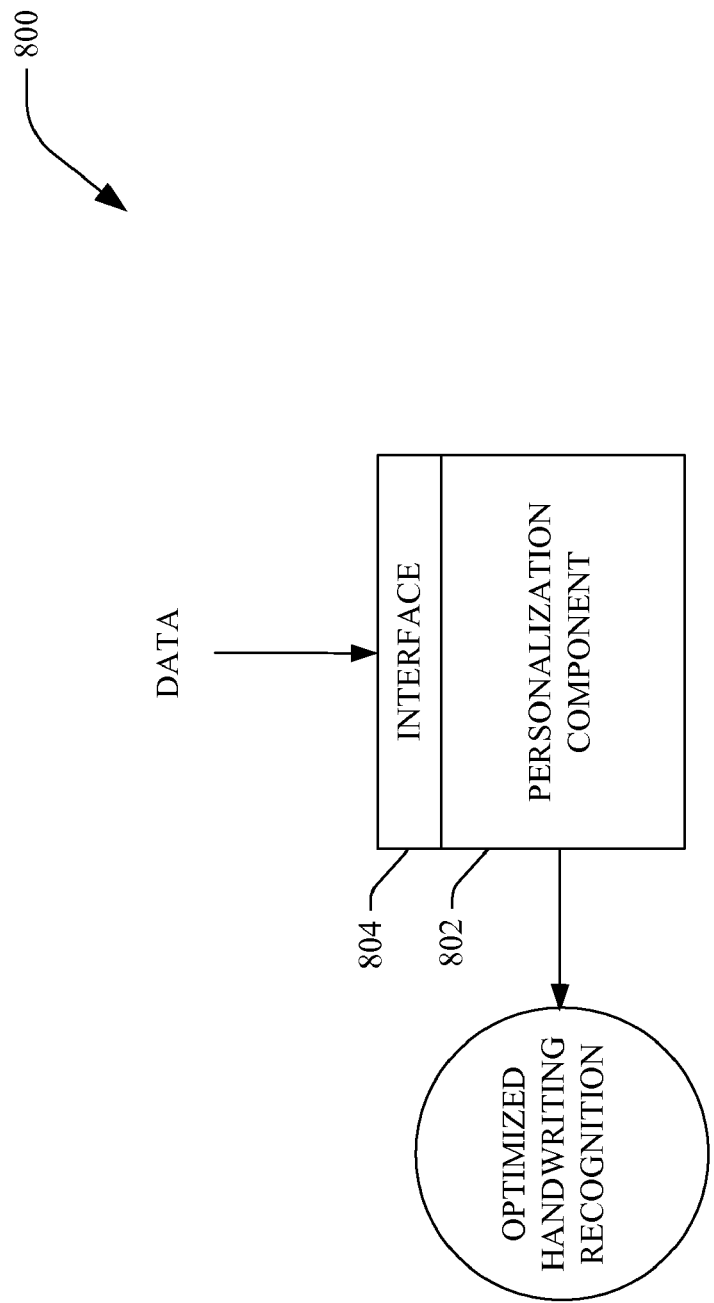
FIG. 8 illustrates a system that facilitates recognizing predetermined groups of linked letters connected based on joining rules of an associated language.

Now turning to FIG. 8, there is illustrated a system 800 that facilitates recognizing predetermined groups of linked letters (which are connected based on joining rules of a language), and/or a letter, which are associated with handwriting utilizing an allograph trained classifier, in accordance with an aspect of the subject innovation. The system 800 can include a personalization component 802 that can train a classifier (not shown) with allograph data, wherein such training facilitates recognizing handwritten characters. The allograph data can be, for instance, automatically generated and/or manually generated data related to a style of handwriting. The personalization component 802 can receive a handwritten character and/or data related to a handwriting sample via an interface component 804, and provide optimized handwriting recognition based at least in part upon the employment of allograph data in training of a classifier. For instance, the data received can be any character and/or word subgroups as described in detail infra. For instance, various computing devices and/or systems utilize handwriting inputs such as, tablets, portable data assistants (PDA's), mobile communication devices, a stylus pen, a wand, an interactive display device with touch screen ability, and the like.

The personalization component 802 can provide writer adaptation, wherein writer adaptation can be the process of converting a generic (e.g., writer-independent) handwriting recognizer into a personalized (e.g., writer dependent) recognizer with improved accuracy for any particular user. The personalization component 802 can implement the adaptation technique with a few samples from a particular user.

The allograph data can be generated manually, automatically, and/or any combination thereof. For instance, the allograph data can be automatically generated employing any suitable clustering technique. Accordingly, an automatic approach for identifying allographs (e.g., character shapes and/or styles) from handwritten characters through clustering can be implemented. In another example, the allograph data can be manually provided utilizing a handwriting expert to provide types and/or styles associated with handwriting.

In addition, the personalization component 802 can train a classifier with allograph data and implement such results in combination with a non-allograph based classifier, to provide the optimized handwriting recognition. The personalization component 802 can seamlessly integrate with an existing recognizer (e.g., handwriting character recognizer) and improve upon it equilaterally employing new samples from an individual. For instance, rather than simply matching a letter, the personalization component 802 can match a letter and/or character with a particular style and/or allograph. Thus, the personalization component 802 can utilize a mapping technique and/or function that can be learnable given writing samples and/or examples from a user. The personalization component 802 can utilize an output from a conventional and/or traditional classifier to apply the mapping function and/or technique to provide a probability of each letter and/or character to optimize handwriting recognition.

Moreover, the system 800 can include any suitable and/or necessary interface component 804, which provides various adapters, connectors, channels, communication paths, etc. to integrate the personalization component 802 into virtually any operating and/or database system(s). In addition, the interface component 804 can provide various adapters, connectors, channels, communication paths, etc., that provide for interaction with the personalization component 802, the data, handwriting data, data associated with optimized handwriting recognition, and optimized handwriting recognition.

Figure 9:
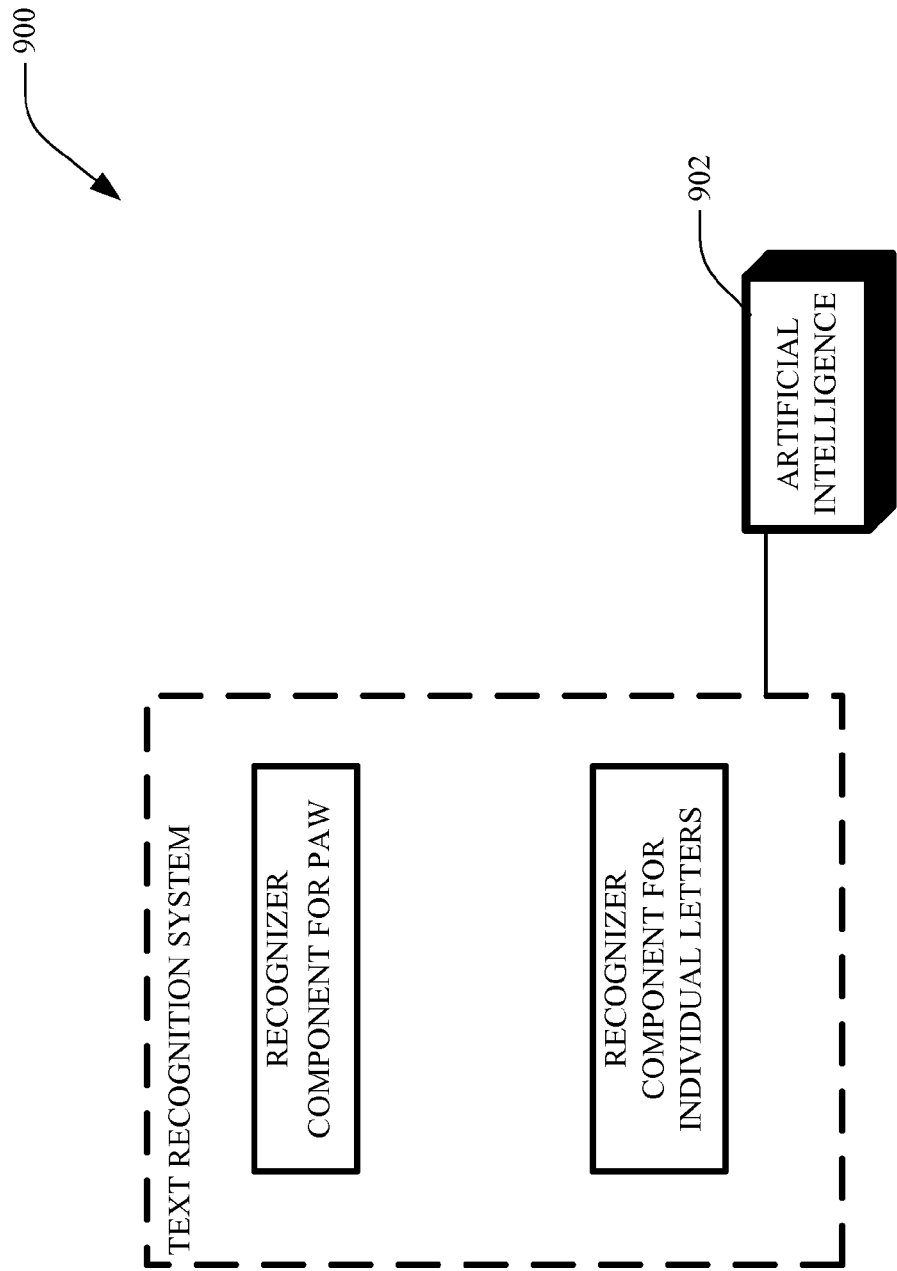
FIG. 9 illustrates an Arabic text recognition system that employs an artificial intelligence component in accordance with a particular aspect of subject innovation.

FIG. 9 illustrates an Arabic text recognition system 900 in accordance with an aspect of subject innovation, wherein such system exploits the conditional joining of letters property in Arabic writing script to decompose the recognition process into two recognition processes that that can be solved simultaneously. Using a Neural Network based PAW recognizer a two-tier Beam search is performed to find the best matching word to the input image. In addition, the artificial intelligence (AI) component 902 can be employed to facilitate recognition processes. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic; that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

For example, and as explained earlier a process for recognizing PAWs and/or individual constituent letters can be facilitated via an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 10:
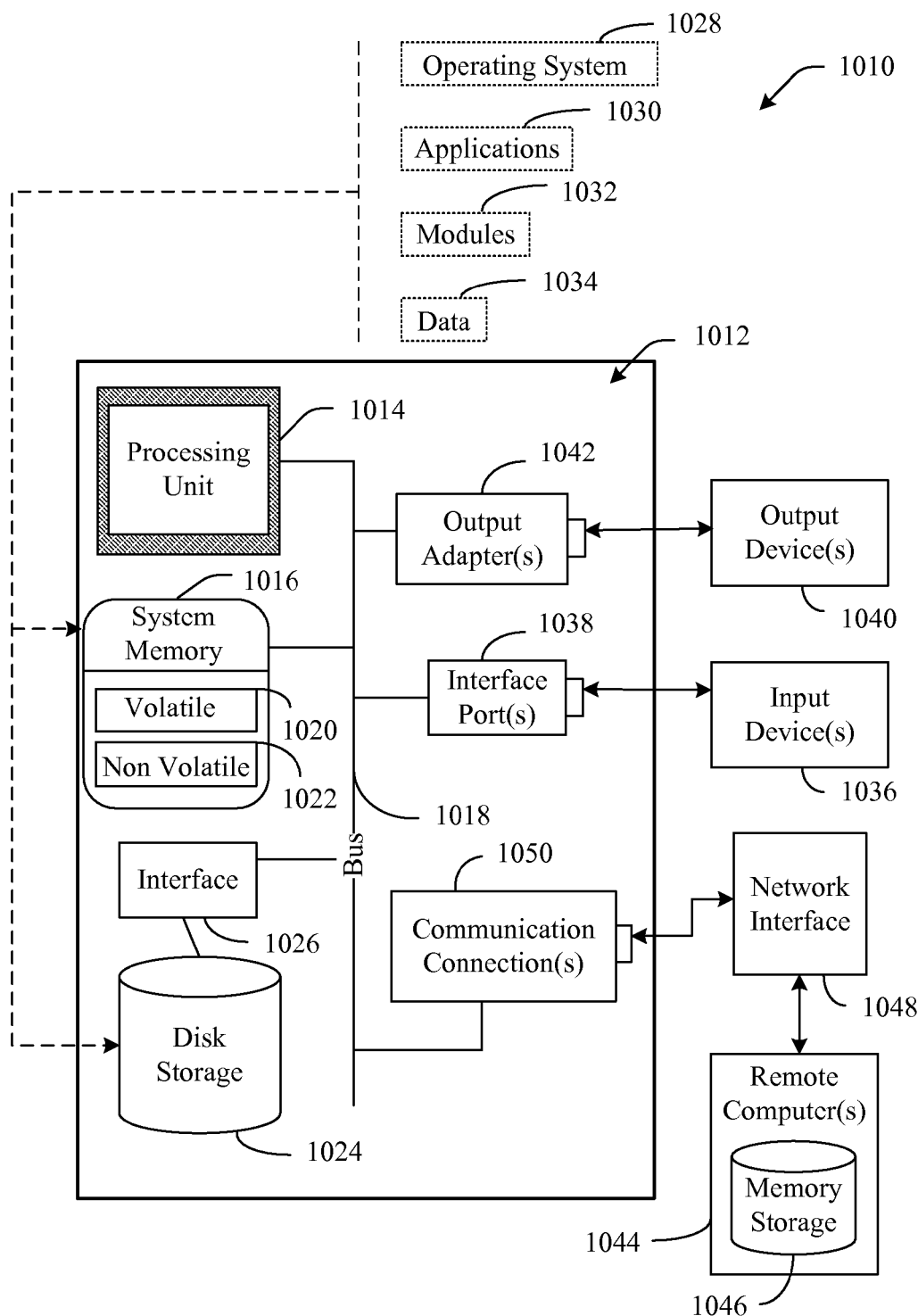
FIG. 10 illustrates an exemplary operating environment for implementing various aspects of the subject innovation.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. Dual microprocessors and other multiprocessor architectures (e.g., multi-core) also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory.

Computer 1012 also includes removable/non-removable, volatile/non-volatile computer storage media. FIG. 10 illustrates, for example, mass or auxiliary storage 1024. Mass storage 1024 includes, but is not limited to, devices like a magnetic disk drive, floppy disk drive, tape drive, Jaz drive, Zip drive, LS-100 drive, flash memory card, or memory stick. In addition, mass storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on mass storage 1024 and loaded to system memory 1016, acts to control and allocate resources of the system 1012. System applications 1030 take advantage of the management of resources by operating system 1028 through program modules 1032 and program data 1034 stored either in system memory 1016 or on mass storage 1024. It is to be appreciated that the subject innovation can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel, CRT, LCD, plasma . . . ), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected (e.g., wired or wirelessly) via communication connection 1050. Network interface 1048 encompasses communication networks such as local-area networks (LAN) and wide-area networks (WAN).

Communication connection(s) 1050 refers to the hardware/software employed to connect the network interface 1048 to the bus 1018. While communication connection 1050 is shown for illustrative clarity inside computer 1016, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards or components.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system that facilitates text recognition comprising:
a word group component for recognition of word groups that are predefined based on joining rules of a language associated with the text, the joining rules defining a Part of an Arabic word (PAW), the word component to label the word groups based on relative horizontal overlaps between the word groups, and to extract features from the text to recognize the word groups of the text utilizing a first classifier to scale the text to a fixed size grid while maintaining an aspect ratio of the text and a second classifier based on directional codes associated with the word groups; and
a letters component for recognition of constituent letters that form the word groups, the letters component to recognize the constituent letters substantially simultaneously as the word group component to recognize the word groups.

2. The system of claim 1, wherein the letters component utilize a user-specific post processor technique to recognize the constitute letters when the constituent letters are deemed ambiguous by the letters component.

3. The system of claim 1, wherein the word group component and the letters component are Neural Net based.

4. The system of claim 1, further comprising personalization component that trains associated classifiers with allograph data.

5. The system of claim 4, wherein the allograph data comprises handwritten allograph data.

6. The system of claim 4, wherein the personalization component includes an adaptation feature to convert writer independent handwriting to personalized hand writing for a user.

7. The system of claim 6, wherein the personalization component includes a mapping feature that supplies probability for a letter appearance.

8. The system of claim 1, wherein the user-specific post processor technique utilizes a maximum likelihood linear regression (MLLR) adapted density module.

9. The system of claim 1, wherein the word group component utilizes a Beam search to recognize the word groups.

10. A computer-implementable method implemented by one or more processors executing processor-executable instructions stored in computer storage media to recognize a text, the method comprising:
simultaneously comparing, by the one or more processors, (1) a text input to predefined groups of linked letters that are connected based on joining rules for language of the input text to recognize linked letters of the text input, and (2) the text input with one or more constituent letters which form the predefined groups of linked letters;
labeling the linked letters of the text input based on relative horizontal overlaps between the linked letters; and
extracting features from the text input to recognize the linked letters of the text input utilizing a first classifier to scale the text input to a fixed size grid while maintaining an aspect ratio of the text input and a second classifier based on directional codes associated with the linked letters.

11. The method of claim 10, further comprising employing a Viterbi search, the Viterbi search including determining an edit distance between two constituent letters.

12. The method of claim 10, further comprising determining an over-segmentation scenario.

13. The method of claim 10, further comprising training a classifier based on allograph data.

14. The method of claim 13, further comprising optimizing handwriting recognition based on the training act.

15. The method of claim 14, further comprising converting a generic hand writing to personalized handwriting.

16. The method of claim 15, further comprising matching letters based on mapping of letters to a particular style.

* * * * *

UNITED STATES PATENT AND TRADEMARK OFFICE
CERTIFICATE OF CORRECTION

PATENT NO. : 7,724,957 B2
APPLICATION NO. : 11/461050
DATED : May 25, 2010
INVENTOR(S) : Ahmad A. Abdulkader Page 1 of 1

It is certified that error appears in the above-identified patent and that said Letters Patent is hereby corrected as shown below:

In column 12, line 10, in Claim 4, after "comprising" insert -- a --.

Signed and Sealed this
Eighth Day of February, 2011

David J. Kappos
*Director of the United States Patent and Trademark Office*